Nov. 24, 1931.  J. EDSTEDT  1,832,926

RENEWABLE GROUSER

Filed Dec. 16, 1929

Inventor:
John Edstedt
By Caswell & Sagaard
Attorneys

Patented Nov. 24, 1931

1,832,926

UNITED STATES PATENT OFFICE

JOHN EDSTEDT, OF MINNEAPOLIS, MINNESOTA

RENEWABLE GROUSER

Application filed December 16, 1929. Serial No. 414,329.

My invention relates to renewable grousers and has for its object to provide a grouser for endless tracks of tractors which may be readily renewed as the same wears.

An object of the invention resides in constructing the grouser with a detachable supporting member and in detachably securing to the said supporting member a number of renewable lugs.

Another object of the invention resides in constructing the supporting member of a tough malleable material and in constructing the lugs of a hard, wear-resisting material.

A still further object of the invention resides in constructing the lugs in the form of angles and in attaching the lugs to the supporting members through the flanges of said angles.

A feature of the invention resides in constructing the supporting member of U-shaped form and in attaching the same to the tread of the track through the arms thereof.

Another object of the invention resides in attaching the traction lugs to the supporting member along the connecting portion thereof, and in disposing said lugs in angular relation to one another.

Other objects of the invention reside in the novel combination and arrangement of parts and in the details of construction hereinafter illustrated and described.

Where tractors of the endless track type are used for heavy hauling and under unfavorable road conditions, considerable wear occurs on the grouser which soon causes the tractor to slip and prevents the same from drawing the desired load. It has heretofore been customary to construct the grouser in one piece and to renew the grouser as soon as the lugs thereof have become worn sufficiently to prevent the same from functioning in the desired manner. Such procedure is extremely expensive inasmuch as the lug proper represents but the smaller portion of the weight of the grouser whereas the body thereof through which the same is attached to the endless track tread represents the greater portion of the weight and in such cases is thrown away and wasted. The instant invention overcomes this disadvantage by providing a simple and effective device whereby a supporting member is utilized for attachment to the tractor and to which the lugs are removably secured.

Figure 1:
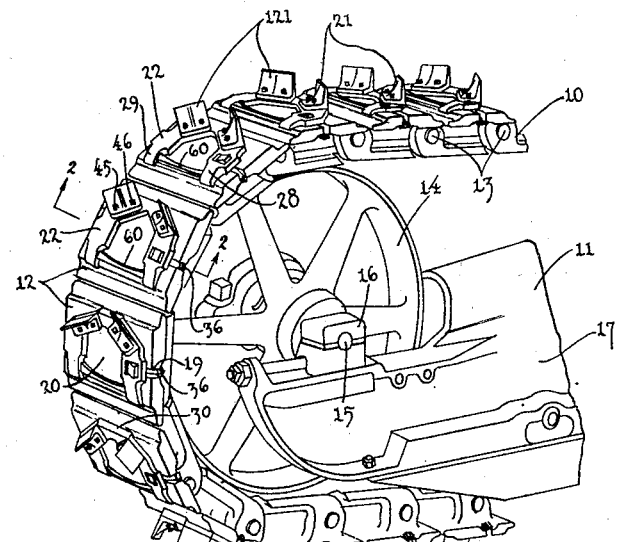
Fig. 1 is a perspective view of a portion of an endless track used for tractors illustrating an embodiment of my invention applied thereto.
Figure 4:
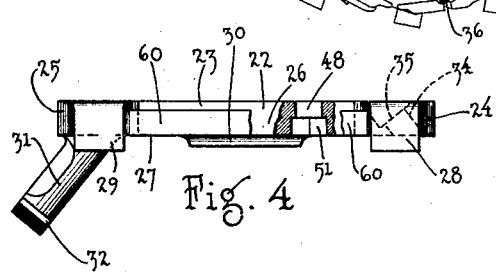
Fig. 4 is an end elevational view of the supporting member of the grouser detached from the track and with the traction lugs removed therefrom, with a part thereof in section.

For the purpose of illustrating the application of my invention I have shown in Fig. 1 a portion of the endless track 10 of a tractor 11. This track consists of a number of treads 12 which are hingedly connected together at 13 to form the track proper. These treads are mounted upon supporting wheels or sprockets 14 which have shafts 15 attached thereto, said shafts being journaled in bearings 16 secured to the supporting structure 17 of the tractor proper. Such construction being well known in the art and forming no feature of the invention has not been described in detail, but has been shown merely for the purpose of illustration though it can be readily comprehended that the invention can be used with any type of tractor tread. In the form of the endless track shown, the treads 12 are constructed along the edges thereof with oblique slots 18 and 19 extending through the same by means of which the grousers may be rapidly and securely attached to the treads. These treads are further formed with an outwardly extending planiform ground engaging surface 20 on which the grousers proper are mounted.

The grouser of my invention comprises a supporting member 22 which has attached to it two traction lugs 21 and 121. These parts will now be described in detail.

The supporting member 22 is constructed with a body portion 23 preferably U-shaped in formation, which is formed with two spaced parallel arms 24 and 25 connected together at one end through a V-shaped connecting portion 26 and at its other end through a tie bar 60. The supporting member is formed with its inner surface 27 substantially planiform and is of a thickness considerably less than the width of the various parts of the same. In applying the supporting member to the tread of the tractor track, the surface 27 is caused to face the planiform surface 20 of the tread proper. For holding the supporting member immovable upon this surface, the arms 24 and 25 are constructed with laterally extending projections 28 and 29 while the connecting portion 26 is similarly constructed with a similar projection 30. These projections engage the edges of the planiform surface 20 and prevent the supporting member from slipping and cause the same to become firmly and rigidly attached thereto when clamped in place.

For attaching the supporting member 22 to the endless track the same is formed with an inclined neck 31 issuing inwardly from the arm 25 of the said supporting member and from the surface 27 thereof. This neck terminates in a head 32 and is adapted to enter the slot 18 of the tread 12. This tread is constructed with a shoulder 33 adjacent the slot 18 which is engaged by the head 32 of neck 31 and which serves to draw the body portion 23 of the member 22 into contact with the tread proper when the said supporting member is moved in a direction to bring the neck 31 into the slot 18. The arm 24 of the body member 23 is constructed with a circular hole 34 disposed directly opposite the neck 31 of the grouser. This hole terminates in a socket 35 either square or hexagonal in form as may be required. Both the hole 34 and socket 35 are inclined at approximately the same degree of the inclination as the neck 31 and receive the head and shank of a bolt 36 which extends through the slot 19 of the tread 12. A nut 37 screwed upon the threaded end 39 of the bolt 36 engages a shoulder 38 formed on tread 12 adjacent to slot 19 and similar to the shoulder 33 and serves to draw the body member 23 toward the tread of the track and to also move the supporting member 22 bodily toward the slot 19 so as to cause the head 32 of the neck 31 to wedge against the shoulder 33 and rigidly clamp the attaching member to the surface 20 of the tread.

Figures 6, 7:
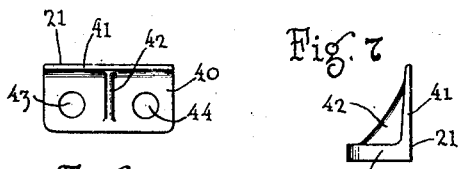
Fig. 6 is a plan view of one of the traction lugs detached from the supporting member.
Fig. 7 is a side elevational view of the lug shown in Fig. 5.

With the form of the invention shown, two lugs 21 and 121 are used with each of the supporting members 22 which lugs are identical in construction. For this reason only the lug 21 will be described in detail. This lug is angular in formation as best shown in Fig. 7 and comprises a flange 40 and a ground engaging up-standing portion 41 issuing outwardly therefrom. These two parts are connected by a small rib 42 which reinforces the same and which is disposed centrally of the device. The flange 40 has drilled in it two holes 43 and 44 which are of a diameter sufficient to receive the shanks of the attaching bolts 45 and 46.

The connecting portion 23 of supporting member 22 is provided with four holes 47, 48, 49 and 50 which extend completely through the same. The holes 47 and 48 are spaced so as to register with the holes of the traction lug 21, while the holes 49 and 50 are similarly spaced so as to register with the corresponding holes of the traction lug 121. These various holes have sockets 51 communicating therewith which are formed in the surface 27 of the attaching member and are centrally disposed relative to the said holes. These sockets are shaped to receive the heads 52 of the bolts 45 and 46 and prevent rotation of the said bolts when the nuts 53 thereof are screwed upon the same.

Figure 3:
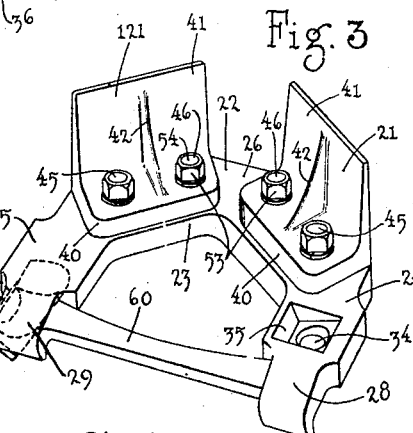
Fig. 3 is a perspective view of the complete grouser detached from the tractor track.
Figure 5:
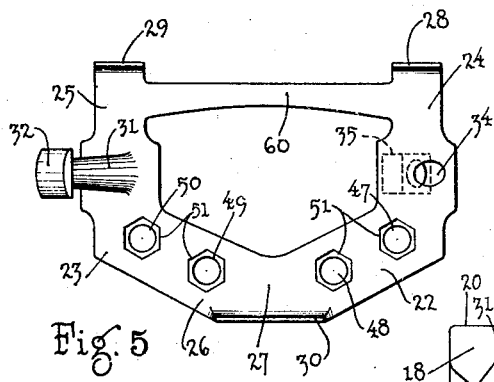
Fig. 5 is an inner plan view of the structure shown in Fig. 3.
Figure 2:
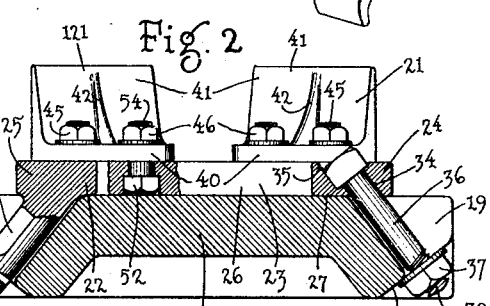
Fig. 2 is a transverse sectional view taken on line 2—2 of Fig. 1.

In attaching the grouser to the endless track the bolts 45 and 46 are first inserted through the holes 47, 48, 49 and 50 with the heads 52 of said bolts lodged within the various sockets 51. The supporting member 22 is thereafter placed upon the tread to which the same is to be attached and the neck 31 slipped into the corresponding slot 18. Bolt 36 is next applied and the nut 37 thereof tightened up to securely attach the supporting member to the proper tread. When so attached the heads 52 of the bolts 45 and 46 become lodged within the sockets 51, the shanks 54 of said bolts extending outwardly therefrom and properly spaced from one another. The lugs 121 and 21 may now be applied to the supporting member causing the shanks of the bolts to extend through the holes 43 and 44 thereof after which the nuts 53 may be applied to the shanks 54 of said bolts and the lugs securely clamped in place by tightening said nuts. If desired, the lugs 21 and 121 may be attached to the supporting member 22 prior to its attachment to the endless track as shown in Fig. 3. In such case the assembled grouser may be secured to the track as previously described. When it is desired to replace the lugs, the nuts 53 are unloosened and the lugs removed and new ones applied as previously described.

The invention is particularly advantageous in that an extremely simple and effective device is provided for the desired purpose. By means of my invention wear on the tractor lugs can be greatly reduced through the use of a sufficiently hard metal to withstand the wear to which the same is subjected. An appreciable economy is effected through the fact that when the lugs wear out the same may be replaced without discarding the entire supporting structure on which the lugs are mounted. By constructing the supporting member of different metal than the lugs, the entire structure may be made of less weight, at the same time having the desired amount of strength, thereby greatly reducing the initial cost of the grouser. The grouser may be removed in its entirety the same as the grouser constructed in one piece so that different types of grousers may be readily interchanged whenever desired or the grouser may be entirely dispensed with when the occasion arises.

Changes in the specific form of my invention, as herein disclosed, may be made within the scope of what is claimed without departing from the spirit of my invention.

Having described my invention, what I claim as new and desire to protect by Letters Patent is:

In combination, a supporting member for attachment to the tread of an endless track for tractors comprising spaced arms and a V-shaped connecting portion between said arms, means connected to said arms for attaching said supporting member to the tread, and traction means, angle shaped in cross section, comprising angularly disposed ground engaging portions and flange portions lying along the connecting portion of said supporting member and attached thereto, said flange portions extending in the same direction as the parts of said supporting member to which they are attached.

In testimony whereof I have affixed my signature to this specification.

JOHN EDSTEDT.